US007074754B2

(12) United States Patent
Blyth et al.

(10) Patent No.: US 7,074,754 B2
(45) Date of Patent: *Jul. 11, 2006

(54) COMPOSITION FOR USE IN THE LAUNDERING OR TREATMENT OF FABRICS

(75) Inventors: Kevin Graham Blyth, Tyne & Wear (GB); Andrew Russell Graydon, Gateshead (GB); Nathalie Sophie Letzelter, Newcastle/Tyne (GB); Glen Steven Ward, Newcastle/Tyne (GB); Kevin Lee Kott, Newcastle/Tyne (GB)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/050,225

(22) Filed: Feb. 3, 2005

(65) Prior Publication Data

US 2005/0170996 A1 Aug. 4, 2005

(51) Int. Cl.
*C12D 3/12* (2006.01)

(52) U.S. Cl. .................................................... 510/507

(58) Field of Classification Search ................ 510/438, 510/443, 444, 507

See application file for complete search history.

(56) References Cited

U.S. PATENT DOCUMENTS

| | | | | |
|---|---|---|---|---|
| 4,062,647 | A | 12/1977 | Storm et al. | |
| 4,066,560 | A | 1/1978 | VanVleck et al. | |
| 4,419,250 | A | 12/1983 | Allen et al. | |
| 4,421,657 | A | 12/1983 | Allen et al. | |
| 4,444,674 | A * | 4/1984 | Gray | 510/313 |
| 4,482,477 | A | 11/1984 | Allen et al. | |
| 4,585,563 | A | 4/1986 | Busch et al. | |
| 4,857,223 | A * | 8/1989 | Borrello | 510/293 |
| 4,885,101 | A | 12/1989 | Tai | |
| 5,277,968 | A | 1/1994 | Canivenc | |
| 5,358,647 | A * | 10/1994 | Puentes-Bravo et al. | 510/328 |
| 5,662,998 | A | 9/1997 | Harry, Jr. | |
| 6,099,892 | A * | 8/2000 | Masden et al. | 427/4 |
| 6,656,901 | B1 | 12/2003 | Moorfield et al. | |
| 2003/0216278 | A1 | 11/2003 | Depoot et al. | |

FOREIGN PATENT DOCUMENTS

| | | |
|---|---|---|
| DE | 101 48 354 A1 | 4/2003 |
| EP | 0 163 352 | 12/1985 |
| EP | 0 299 575 | 1/1989 |
| EP | 0 381 487 | 8/1990 |
| EP | 0 381 487 A1 | 8/1990 |
| EP | 0 483 411 A1 | 5/1992 |
| GB | 2 138 037 | 10/1984 |
| GB | 2 384 243 A | 7/2003 |
| JP | 04-327502 | 11/1992 |
| JP | 06-211634 | 8/1994 |
| JP | 07-291705 | 11/1995 |
| JP | 09-087699 | 3/1997 |
| JP | 2001-139990 | 5/2001 |
| JP | 2002-104926 | 4/2002 |
| WO | WO 92/07927 | 5/1992 |
| WO | WO 02/092748 | 11/2002 |
| WO | WO 03/055966 | 7/2003 |

* cited by examiner

*Primary Examiner*—John R. Hardee
(74) *Attorney, Agent, or Firm*—Julia A. Glazer; David V. Upite

(57) ABSTRACT

The present invention relates to an auxiliary composition, for use in the laundering or treatment of fabrics, comprising a co-particulate admix, the co-particulate admix comprises: (i) clay; and (ii) a hydrophobic component; and (iii) a charged polymeric fabric-softening boosting component; wherein the auxiliary composition further comprises a flocculating aid and optionally one or more adjunct components.

20 Claims, No Drawings

COMPOSITION FOR USE IN THE LAUNDERING OR TREATMENT OF FABRICS

TECHNICAL FIELD

The present invention relates to a composition for use in the laundering or treatment of fabrics. More specifically, the present invention relates to a laundry detergent composition capable of both cleaning and softening fabric during a laundering process.

BACKGROUND

Laundry detergent compositions that both clean and soften fabric during a laundering process are known and have been developed and sold by laundry detergent manufacturers for many years. Typically, these laundry detergent compositions comprise components that are capable of providing a fabric-softening benefit to the laundered fabric; these fabric-softening components include clays.

The incorporation of clay into laundry detergent compositions to impart a fabric-softening benefit to the laundered fabric is described in the following references. A granular, built laundry detergent composition comprising a smectite clay that is capable of both cleaning and softening a fabric during a laundering process is described in U.S. Pat. No. 4,062,647 (Storm, T. D., and Nirschl, J. P.; The Procter & Gamble Company). A heavy-duty fabric-softening detergent comprising bentonite clay agglomerates is described in GB 2 138 037 (Allen, E., Coutureau, M., and Dillarstone, A.; Colgate-Palmolive Company). Laundry detergents compositions containing fabric-softening clays of between 150 and 2,000 micrometers in size are described in U.S. Pat. No. 4,885,101 (Tai, H. T.; Lever Brothers Company). The fabric-softening performance of a clay-containing laundry detergent composition is improved by the incorporation of a flocculating aid to the clay-containing laundry detergent composition. For example, a detergent composition comprising a smectite type clay and a polymeric clay-flocculating agent is described in EP 0 299 575 (Raemdonck, H., and Busch, A.; The Procter & Gamble Company).

The use of silicones to provide a fabric-softening benefit to laundered fabric during a laundering process is also known. U.S. Pat. No. 4,585,563 (Busch, A., and Kosmas, S.; The Procter & Gamble Company) describes that specific organo-functional polydialkylsiloxanes can advantageously be incorporated in granular detergents to provide remarkable benefits inclusive of through-the-wash softening and further textile handling improvements. U.S. Pat. No. 5,277,968 (Canivenc, E.; Rhone-Poulenc Chemie) describes a process for the conditioning of textile substrates to allegedly impart a pleasant feel and good hydrophobicity thereto, comprising treating such textile substances with an effective conditioning amount of a specific polydiorganosiloxane.

Detergent Manufacturers have attempted to incorporate both clay and silicone in the same laundry detergent composition. For example, siliconates were incorporated in clay-containing compositions to allegedly improve their dispensing performance. U.S. Pat. No. 4,419,250 (Allen, E., Dillarstone, R., and Reul, J. A.; Colgate-Palmolive Company) describes agglomerated bentonite particles that comprise a salt of a lower alkyl siliconic acid and/or a polymerization product(s) thereof. U.S. Pat. No. 4,421,657 (Allen, E., Dillarstone, R., and Reul, J. A.; Colgate-Palmolive Company) describes a particulate heavy-duty laundering and textile-softening composition comprising bentonite clay and a siliconate. U.S. Pat. No. 4,482,477 (Allen, E., Dillarstone, R., and Reul, J. A.; Colgate-Palmolive Company) describes a particulate built synthetic organic detergent composition which includes a dispensing assisting proportion of a siliconate and preferably bentonite as a fabric-softening agent. In another example, EP 0 163 352 (York, D. W.; The Procter & Gamble Company) describes the incorporation of silicone into a clay-containing laundry detergent composition in an attempt to control the excessive suds that are generated by the clay-containing laundry detergent composition during the laundering process. EP 0 381 487 (Biggin, I. S., and Cartwright, P. S.; BP Chemicals Limited) describes an aqueous based liquid detergent formulation comprising clay that is pretreated with a barrier material such as a polysiloxane.

Detergent manufacturers have also attempted to incorporate a silicone, clay and a flocculant in a laundry detergent composition. For example, a fabric treatment composition comprising substituted polysiloxanes, fabric-softening clay and a clay flocculant is described in WO92/07927 (Marteleur, C. A. A. V. J., and Convents, A. C.; The Procter & Gamble Company).

More recently, fabric care compositions comprising an organophilic clay and functionalised oil are described in U.S. Pat. No. 6,656, 901 B2 (Moorfield, D., and Whilton, N.; Unilever Home & Personal Care US division of Conopco, Inc.). WO02/092748 (Instone, T. et al; Unilever PLC) describes a granular composition comprising an intimate blend of a non-ionic surfactant and a water-insoluble liquid, which may be a silicone, and a granular carrier material, which may be a clay. WO03/055966 (Cocardo, D. M., et al; Hindustain Lever Limited) describes a fabric care composition comprising a solid carrier, which may be a clay, and an anti-wrinkle agent, which may be a silicone.

However, despite all of the above attempts, whatever improved fabric-softening performance benefit that detergent manufacturers have been able to achieve for a laundry detergent has come at the expense of its fabric-cleaning performance. Therefore, there is still a need to improve the fabric-softening performance of a laundry detergent composition without unduly negatively affecting its fabric-cleaning performance.

SUMMARY

The present invention overcomes the above mentioned problem by providing an auxiliary composition, for use in the laundering or treatment of fabrics, comprising a co-particulate admix, the co-particulate admix comprises: (i) clay; and (ii) a hydrophobic component; and (iii) a charged polymeric fabric-softening boosting component; wherein the auxiliary composition further comprises a flocculating aid and optionally one or more adjunct components.

DETAILED DESCRIPTION

Clay

Typically, the clay is a fabric-softening clay such as a smectite clay. Preferred smectite clays are beidellite clays, hectorite clays, laponite clays, montmorillonite clays, nontonite clays, saponite clays and mixtures thereof. Preferably, the smectite clay is a dioctahedral smectite clay, more preferably a montmorillonite clay. Dioctrahedral smectite clays typically have one of the following two general formulae:

$$Na_xAl_{2-x}Mg_xSi_4O_{10}(OH)_2 \quad \text{Formula (I)}$$

or $$Ca_xAl_{2-x}Mg_xSi_4O_{10}(OH)_2 \qquad \text{Formula (II)}$$

wherein x is a number from 0.1 to 0.5, preferably from 0.2 to 0.4.

Preferred clays are low charge montmorillonite clays (also known as a sodium montmorillonite clay or Wyoming-type montmorillonite clay) which have a general formula corresponding to formula (I) above. Preferred clays are also high charge montmorillonite clays (also known as a calcium montmorillonite clay or Cheto-type montmorillonite clay) which have a general formula corresponding to formula (II) above. Preferred clays are supplied under the tradenames: Fulasoft 1 by Arcillas Activadas Andinas; White Bentonite STP by Fordamin; and Detercal P7 by Laviosa Chemica Mineraria SPA.

The clay may be a hectorite clay. Typical hectorite clay has the general formula:

$$[(Mg_{3-x}Li_x)Si_{4-y}Me^{III}_yO_{10}(OH_{2-z}F_z)]^{-(x+y)}((x+y)/n)M^{n+} \qquad \text{Formula (III)}$$

wherein y=0 to 0.4, if y=>0 then $Me^{III}$ is Al, Fe or B, preferably y=0; $M^{n+}$ is a monovalent (n=1) or a divalent (n=2) metal ion, preferably selected from Na, K, Mg, Ca and Sr. x is a number from 0.1 to 0.5, preferably from 0.2 to 0.4, more preferably from 0.25 to 0.35. z is a number from 0 to 2. The value of (x+y) is the layer charge of the clay, preferably the value of (x+y) is in the range of from 0.1 to 0.5, preferably from 0.2 to 0.4, more preferably from 0.25 to 0.35. A preferred hectorite clay is that supplied by Rheox under the tradename Bentone HC. Other preferred hectorite clays for use herein are those hectorite clays supplied by CSM Materials under the tradename Hectorite U and Hectorite R, respectively.

The clay may also be selected from the group consisting of: allophane clays; chlorite clays, preferred chlorite clays are amesite clays, baileychlore clays, chamosite clays, clinochlore clays, cookeite clays, corundophite clays, daphnite clays, delessite clays, gonyerite clays, nimite clays, odinite clays, orthochamosite clays, pannantite clays, penninite clays, rhipidolite clays, sudoite clays and thuringite clays; illite clays; inter-stratified clays; iron oxyhydroxide clays, preferred iron oxyhydroxide clays are hematite clays, goethite clays, lepidocrite clays and ferrihydrite clays; kaolin clays, preferred kaolin clays are kaolinite clays, halloysite clays, dickite clays, nacrite clays and hisingerite clays; smectite clays; vermiculite clays; and mixtures thereof.

The clay may also be a light coloured crystalline clay mineral, preferably having a reflectance of at least 60, more preferably at least 70, or at least 80 at a wavelength of 460 nm. Preferred light coloured crystalline clay minerals are china clays, halloysite clays, dioctahedral clays such as kaolinite, trioctahedral clays such as antigorite and amesite, smectite and hormite clays such as bentonite (montmorillonite), beidilite, nontronite, hectorite, attapulgite, pimelite, mica, muscovite and vermiculite clays, as well as pyrophyllite/talc, willemseite and minnesotaite clays. Preferred light coloured crystalline clay minerals are described in GB2357523A and WO01/44425.

Preferred clays have a cationic exchange capacity of at least 70 meq/100 g. The cationic exchange capacity of clays can be measured using the method described in Grimshaw, The Chemistry and Physics of Clays, Interscience Publishers, Inc., pp. 264–265 (1971).

Preferably, the clay has a weight average primary particle size, typically of greater than 20 micrometers, preferably more than 23 micrometers, preferably more than 25 micrometers, or preferably from 21 micrometers to 60 micrometers, more preferably from 22 micrometers to 50 micrometers, more preferably from 23 micrometers to 40 micrometers, more preferably from 24 micrometers to 30 micrometers, more preferably from 25 micrometers to 28 micrometers. Clays having these preferred weight average primary particle sizes provide a further improved fabric-softening benefit. The method for determining the weight average particle size of the clay is described in more detail hereinafter.

Method for Determining the Weight Average Primary Particle Size of the Clay:

The weight average primary particle size of the clay is typically determined using the following method: 12 g clay is placed in a glass beaker containing 250 ml distilled water and vigorously stirred for 5 minutes to form a clay solution. The clay is not sonicated, or microfluidised in a high pressure microfluidizer processor, but is added to said beaker of water in an unprocessed form (i.e. in its raw form). 1 ml clay solution is added to the reservoir volume of an Accusizer 780 single-particle optical sizer (SPOS) using a micropipette. The clay solution that is added to the reservoir volume of said Accusizer 780 SPOS is diluted in more distilled water to form a diluted clay solution; this dilution occurs in the reservoir volume of said Accusizer 780 SPOS and is an automated process that is controlled by said Accusizer 780 SPOS, which determines the optimum concentration of said diluted clay solution for determining the weight average particle size of the clay particles in the diluted clay solution. The diluted clay solution is left in the reservoir volume of said Accusizer 780 SPOS for 3 minutes. The clay solution is vigorously stirred for the whole period of time that it is in the reservoir volume of said Accusizer 780 SPOS. The diluted clay solution is then sucked through the sensors of said Accusizer 780 SPOS; this is an automated process that is controlled by said Accusizer 780 SPOS, which determines the optimum flow rate of the diluted clay solution through the sensors for determining the weight average particle size of the clay particles in the diluted clay solution. All of the steps of this method are carried out at a temperature of 20° C. This method is carried out in triplicate and the mean of these results determined.

Hydrophobic Component

Typically, the hydrophobic component is a silicone, more preferably a fabric-softening silicone.

The silicone typically has the general formula:

Formula (IV)

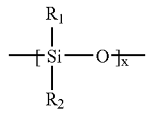

wherein, each $R_1$ and $R_2$ in each repeating unit, —(Si($R_1$)($R_2$)O)—, are independently selected from branched or unbranched, substituted or unsubstituted $C_1$–$C_{10}$ alkyl or alkenyl, substituted or unsubstituted phenyl, or units of —[—$R_1R_2$Si—O—]—; x is a number from 50 to 300,000, preferably from 100 to 100,000, more preferably from 200 to 50,000; wherein, the substituted alkyl, alkenyl or phenyl are typically substituted with halogen, amino, hydroxyl groups, quaternary ammonium groups, polyalkoxy groups, carboxyl groups, or nitro groups; and wherein the polymer is terminated by a hydroxyl group, hydrogen or —$SiR_3$, wherein, $R_3$ is hydroxyl, hydrogen, methyl or a functional group.

Suitable silicones include: amino-silicones, such as those described in EP150872, WO92/01773 and U.S. Pat. No. 4,800,026; quatemary-silicones, such as those described in U.S. Pat. No. 4,448,810 and EP459821; high-viscosity silicones, such as those described in WO00/71806 and WO00/71807; modified polydimethylsiloxane; functionalized polydimethyl siloxane such as those described in U.S. Pat. No. 5,668,102. Preferably, the silicone is a polydimethylsiloxane.

The silicone may preferably be a silicone mixture of two or more different types of silicone. Preferred silicone mixtures are those comprising: a high-viscosity silicone and a low viscosity silicone; a functionalised silicone and a non-functionalised silicone; or a non-charged silicone polymer and a cationic silicone polymer.

The silicone typically has a viscosity of from 5,000 cp to 5,000,000 cp, or from greater than 10,000 cp to 1,000,000 cp, or from 10,000 cp to 600,000 cp, more preferably from 50,000 cp to 400,000 cp, and more preferably from 80,000 cp to 200,000 cp when measured at a shear rate of 20 $s^{-1}$ and at ambient conditions (20° C. and 1 atmosphere). Typically, the silicone is a polymeric silicone comprising more than 3, preferably more than 5 or even more than 10 siloxane monomer units.

The silicone is preferably in the form of an emulsion, especially when the silicone is admixed with the clay. Typically the emulsion has a volume average primary droplet size of from 0.1 micrometers to 5,000 micrometers, preferably from 0.1 micrometers to 50 micrometers, and most preferably from 0.1 micrometers to 5 micrometers. The volume average primary particle size is typically measured using a Coulter Multisizer™ or by the method described in more detail below. The emulsion typically has a viscosity of from 1,500 cp to 50,000 cp, preferably from 5,000 cp to 25,000 cp. The silicone is preferably in liquid or liquefiable form, especially when the silicone is admixed with the clay.

Commercially available silicone oils that are suitable for use are DC200™ (12,500 cp to 600,000 cp), supplied by Dow Coming, or silicones of the Baysilone Fluid M series supplied by GE Silicone. Alternatively, preformed silicone emulsions are also suitable for use. These emulsions may comprise water and/or other solvents in an effective amount to aid the emulsification of the silicone/solvent mixture.

Method for Determining the Volume Average Droplet Size of the Emulsion:

The volume average droplet size of the emulsion is typically determined by the following method: An emulsion is applied to a microscope slide with the cover slip being gently applied. The emulsion is observed at 400× and 1,000× magnification under the microscope and the average droplet size of the emulsion is calculated by comparison with a standard stage micrometer.

Charged Polymeric Fabric-softening Boosting Component

The charged polymeric fabric-softening boosting component is preferably cationic. Preferably, the charged polymeric fabric-softening boosting component is a cationic guar gum.

The charged polymeric fabric-softening boosting component may be a cationic polymer that comprises (i) acrylamide monomer units, (ii) other cationic monomer units and (iii) optionally, other monomer units. The charged polymeric fabric-softening boosting component may be a cationically-modified polyacrylamide or co-polymer thereof, any cationic modification can be used for these polyacrylamides. Highly preferred charged polymeric fabric-softening boosting components are co-polymers of acrylamide and a methyl chloride quaternary salt of dimethylaminoethyl acrylate (DMA3-MeCl), for example such as those supplied by BASF, Ludwigshafen, Germany, under the tradename Sedipur CL343.

The general structure for DMA3MeCl is:

Formula (V)

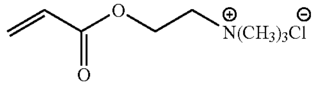

The general structure of acrylamide is:

Formula (VI)

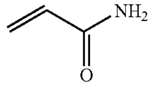

Preferred cationic polymers have the following general structure:

Formula (VII)

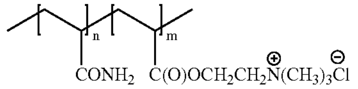

wherein n and m independently are numbers in the range of from 100 to 100,000, preferably from 800 to 3400. The molar ratio of n:m is preferably in the range of from 4:1 to 3:7, preferably from 3:2 to 2:3.

Suitable charged polymeric fabric-softening boosting components are described in more detail in, and can be synthesized according to the methods described in, DE10027634, DE10027636, DE10027638, U.S. Pat. No. 6,111,056, U.S. Pat. No. 6,147,183, WO98/17762, WO98/21301, WO01/05872 and, WO01/05874.

The charged polymeric fabric-softening boosting component preferably has an average degree of cationic substitution of from 1% to 70%, preferably from above 10% to 70%, more preferably from 10% to 60%. If the charged polymeric fabric-softening boosting component is a cationic guar gum, then preferably its degree of cationic substitution is from 10% to 15%. However, if the charged polymeric fabric-softening boosting component is a polymer having a general structure according to formula VII above, then preferably its degree of cationic substitution is from 40% to 60%. The average degree of cationic substitution typically means the molar percentage of monomers in the cationic polymer that are cationically substituted. The average degree of cationic substitution can be determined by any known methods, such as colloid titration. One such colloid titration method is described in more detail by Horn, D., in Prog. Colloid & Polymer Sci., 1978, 8, p243–265.

The charged polymeric fabric-softening boosting component preferably has a charge density of from 0.2 meq/g to 1.5 meq/g. The charge density is typically defined in terms of the number of charges carried by the polymer, expressed in milliequivalents/gram. One equivalent is the weight of the material required to give one mole of charge; one milliequivalent is a thousandth of this.

Preferably, the charged polymeric fabric-softening boosting component has a weight average molecular weight of from above 100,000 Da to below 10,000,000 Da, preferably from 500,000 Da to 2,000,000 Da, and preferably from 1,000,000 Da to 2,000,000. Any known gel permeation chromatography (GPC) measurement methods for determining the weight average molecular weight of a polymer can be used to measure the weight average molecular weight of the charged polymeric fabric-softening boosting component. GPC measurements are described in more detail in Polymer Analysis by Stuart, B. H., p108–112, published by John Wiley & Sons Ltd, UK, ® 2002. A typical GPC method for determining the weight average molecular weight of the charged polymeric fabric-softening boosting component is described below:

Method for Determining the Weight Average Molecular Weight of the Charged Polymeric Fabric-Softening Boosting Component:

1. Dissolve 1.5 g of polymer in 1 litre of deionised water.
2. Filter the mixture obtained in step 1, using a Sartorius Minisart RC25 filter.
3. According the manufacturer's instructions, inject 100 litres of the mixture obtained in step 2., on a GPC machine that is fitted with a Suprema MAX (8 mm by 30 cm) column operating at 35° C. and a ERC7510 detector, with 0.2M aqueous solution of acetic acid and potassium chloride solution being used as an elution solvent at a flux of 0.8 ml/min.
4. The weight average molecular weight is obtained by analysing the data from the GPC according to the manufacturer's instructions.

Flocculating Aid

The flocculating aid is capable of flocculating clay. Typically, the flocculating aid is polymeric. Preferably the flocculating aid is a polymer comprising monomer units selected from the group consisting of ethylene oxide, acrylamide, acrylic acid and mixtures thereof. Preferably the flocculating aid is a polyethyleneoxide. Typically the flocculating aid has a molecular weight of at least 100,000 Da, preferably from 150,000 Da to 5,000,000 Da and most preferably from 200,000 Da to 700,000 Da.

Adjunct Components

The auxiliary composition and/or the laundry detergent composition may optionally comprise one or more adjunct components. These adjunct components are typically selected from the group consisting of detersive surfactants, builders, polymeric co-builders, bleach, chelants, enzymes, anti-redeposition polymers, soil-release polymers, polymeric soil-dispersing and/or soil-suspending agents, dye-transfer inhibitors, fabric-integrity agents, brighteners, suds suppressors, fabric-softeners, flocculants, and combinations thereof.

Co-particulate Admix

The co-particulate admix comprises the clay, the hydrophobic component and the charged polymeric fabric-softening boosting component. Optionally, the co-particulate admix comprises one or more adjunct components.

The co-particulate admix is preferably obtainable or obtained by a process comprising the steps of contacting the hydrophobic component, preferably in liquid or liquefiable form and most preferably in an emulsified form, with the clay and the charged polymeric fabric-softening boosting component to form a mixture, and then agglomerating the mixture in a high shear mixer and/or a low shear mixture optionally followed by a drying step, to form a co-particulate admix. Preferably, the co-particulate admix is in an agglomerate form, although the co-particulate admix could be in the form of a granule, flake, extrudate, noodle, needle or an agglomerate.

Auxiliary Composition

The auxiliary composition is for use in the laundering or treatment of fabrics and typically either forms part of a fully formulated laundry detergent composition or is an additive composition suitable for addition to, or suitable to be used in combination with, a fully formulated laundry detergent composition. Preferably, the auxiliary composition forms part of a fully formulated laundry detergent composition.

The auxiliary composition comprises the co-particulate admix, the flocculating aid and optionally one or more adjunct components. Preferably, the flocculating aid is present in the auxiliary composition as a separate particulate component to the co-particulate admix; this means that typically, the flocculating aid is not present in the same particle as the clay, hydrophobic component and charged polymeric fabric-softening boosting component.

The weight ratio of clay to flocculating aid present in the auxiliary composition is preferably in the range of from 10:1 to 200:1, preferably from 14:1 to 160:1, more preferably from 20:1 to 100:1 and more preferably from 50:1 to 80:1.

Laundry Detergent Composition

The laundry detergent composition comprises the auxiliary composition, a detersive surfactant, optionally a builder and optionally a bleach. The laundry detergent composition optionally comprises one or more other adjunct components.

The laundry detergent composition is preferably in particulate form, more preferably in free-flowing particulate form, although the composition may be in any liquid or solid form. The composition in solid form can be in the form of an agglomerate, granule, flake, extrudate, bar, tablet or any combination thereof. The solid composition can be made by methods such as dry-mixing, agglomerating, compaction, spray drying, pan-granulation, spheronization or any combination thereof. The solid composition preferably has a bulk density of from 300 g/l to 1,500 g/l, preferably from 500 g/l to 1,000 g/l.

The composition may also be in the form of a liquid, gel, paste, dispersion, preferably a colloidal dispersion or any combination thereof. Liquid compositions typically have a viscosity of from 500 cps to 3,000 cps, when measured at a shear rate of 20 $s^{-1}$ at ambient conditions (20° C. and 1 atmosphere), and typically have a density of from 800 g/l to 1300 g/l. If the composition is in the form of a dispersion, then it will typically have a volume average particle size of from 1 micrometer to 5,000 micrometers, preferably from 1 micrometer to 50 micrometers. The particles that form the dispersion are usually the clay and, if present, the silicone. Typically, a Coulter Multisizer is used to measure the volume average particle size of a dispersion.

The composition may in unit dose form, including not only tablets, but also unit dose pouches wherein the composition is at least partially enclosed, preferably completely enclosed, by a film such as a polyvinyl alcohol film.

The composition is capable of both cleaning and softening fabric during a laundering process. Typically, the composition is formulated for use in an automatic washing machine, although it can also be formulated for hand-washing use.

The following adjunct components and levels thereof, when incorporated into a laundry detergent composition of the present invention, further improve the fabric-softening performance and fabric-cleaning performance of the laundry detergent composition: at least 10% by weight of the composition of alkyl benzene sulphonate detersive surfactant; at least 0.5%, preferably at least 1% and more preferably at least 2% by weight of the composition of cationic quaternary ammonium detersive surfactant; at least 1% by weight of the composition alkoxylated alkyl sulphate detersive surfactant, preferably ethoxylated alkyl sulphate detersive surfactant; less than 12% or even less than 6%, or even 0%, by weight of the composition zeolite builder; and any combination thereof. Preferably the laundry detergent composition comprises at least 6%, or even at least 8%, or even at least 12%, or even at least 18%, by weight of the laundry detergent composition of the auxiliary composition. Preferably the composition comprises at least 0.3% by weight of the composition of a flocculating aid.

EXAMPLES

Example 1

A Process for Preparing a Silicone Emulsion 81.9 g of silicone (polydimethylsiloxane) having a viscosity of 100,000 cp is added to a beaker. 8.2 g of 30 w/w % aqueous $C_{11}$–$C_{13}$ alkyl benzenesulphonate (LAS) solution is then added the beaker and the silicone, LAS and water are mixed thoroughly by hand using a flat knife for 2 minutes to form an emulsion.

Example 2

A Process for Making a Clay/Silicone Agglomerate 601.2 g of bentonite clay and 7.7 g of cationic guar gum are added to a Braun mixer. 90.1 g of the emulsion of example 1 is added to the Braun mixer, and all of the ingredients in the mixer are mixed for 10 seconds at 1,100 rpm (speed setting 8). The speed of the Braun mixer is then increased to 2,000 rpm (speed setting 14) and 50 g water is added slowly to the Braun mixer. The mixer is kept at 2,000 rpm for 30 seconds so that wet agglomerates are formed. The wet agglomerates are transferred to a fluid bed dried and dried for 4 minutes at 137° C. to form dry agglomerates. The dry agglomerates are sieved to removed agglomerates having a particle size greater than 1,400 micrometers and agglomerates having a particle size of less than 250 micrometers.

Example 3

A Clay/Silicone Agglomerate

A clay/silicone agglomerate suitable for use in the present invention comprises: 80.3 wt % bentonite clay, 1.0 wt % cationic guar gum, 10.9 wt % silicone (polydimethylsiloxane), 0.3 wt % $C_{11}$–$C_{13}$ alkyl benzenesulphonate (LAS) and 7.5 wt % water.

Example 4

A Clay/Silicone Agglomerate

A clay/silicone agglomerate suitable for use in the present invention comprises: 72.8 wt % bentonite clay, 0.7 wt % cationic guar gum, 15.9 wt % silicone (polydimethylsiloxane), 0.5 wt % $C_{11}$–$C_{13}$ alkyl benzenesulphonate (LAS) and 10.0 wt % water.

Example 5

A Laundry Detergent Composition

A laundry detergent composition suitable for use, in the present invention comprises: 15 wt % clay/silicone agglomerates of either example 3 or example 4 above; 0.2 wt % polyethylene oxide having a weight average molecular weight of 300,000 Da; 11 wt % C11–13 linear alkylbenzenesulphonate detersive surfactant; 0.3 wt % C12–14 alkyl sulphate detersive surfactant; 1 wt % $C_{12}$–$C_{14}$ alkyl, di-methyl, ethoxy quaternary ammonium detersive surfactant; 4 wt % crystalline layered sodium silicate; 12 wt % zeolite A; 2.5 wt % citric acid; 20 wt % sodium carbonate; 0.1 wt % sodium silicate; 0.8 wt % hydrophobically modified cellulose; 0.2 wt % protease; 0.1 wt % amylase; 1.5 wt % tetraacetlyethylenediamine; 6.5 wt % percarbonate; 0.1 wt % ethylenediamine-N'N-disuccinic acid, (S,S) isomer in the form of a sodium salt; 1.2 wt % 1,1-hydroxyethane diphosphonic acid; 0.1 wt % magnesium sulphate; 0.7 wt % perfume; 18 wt % sulphate; 4.7 wt % miscellaneous/water.

Example 6

A Laundry Detergent Composition

A laundry detergent composition suitable for use in the present invention comprises: 12.5 wt % clay/silicone agglomerates of either example 3 or example 4 above; 0.3 wt % polyethylene oxide having a weight average molecular weight of 300,000 Da; 11 wt % $C_{11\text{-}13}$ linear alkylbenzenesulphonate detersive surfactant; 2.5 wt % $C_{12}$–$C_{14}$ alkyl, di-methyl, ethoxy quaternary ammonium detersive surfactant; 4 wt % crystalline layered sodium silicate; 12 wt % zeolite A; 20 wt % sodium carbonate; 1.5 wt % tetraacetlyethylenediamine; 6.5 wt % percarbonate; 1.0 wt % perfume; 18 wt % sulphate; 10.7 wt % miscellaneous/water.

Example 7

A Laundry Detergent Composition

A laundry detergent composition suitable for use in the present invention comprises: 12.5 wt % clay/silicone agglomerates of either example 3 or example 4 above; 6.0 wt % clay; 0.3 wt % polyethylene oxide having a weight average molecular weight of 300,000 Da; 10 wt % $C_{11\text{-}13}$ linear alkylbenzenesulphonate detersive surfactant; 1 wt % alkyl sulphate detersive surfactant condensed with an average of 7 moles of ethylene oxide; 4 wt % crystalline layered sodium silicate; 18 wt % zeolite A; 20 wt % sodium carbonate; 1.5 wt % tetraacetlyethylenediamine; 6.5 wt % percarbonate; 1.0 wt % perfume; 15 wt % sulphate; 4.2 wt % miscellaneous/water.

All documents cited in the Detailed Description of the Invention are, in relevant part, incorporated herein by reference; the citation of any document is not to be construed as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. An auxiliary composition, for use in the laundering or treatment of fabrics, the auxiliary composition comprising:
   a co-particulate admix, the co-particulate admix comprised of:
   (i) clay;
   (ii) polydimethylsiloxane; and
   (iii) a cationic polymeric fabric-softening boosting component; wherein the auxiliary composition comprises a flocculating aid and optionally one or more adjunct components.

2. An auxiliary composition according to claim 1, wherein the clay is a fabric-softening clay.

3. An auxiliary composition according to claim 1, wherein the clay is a montmorillonite clay.

4. An auxiliary composition of claim 1, wherein the hydrophobic component is a silicone.

5. An auxiliary composition of claim 1, wherein the polydimethylsiloxane has a viscosity of from about 10,000 cP to about 600,000 cP at a shear rate of 20 $s^{-1}$.

6. An auxiliary composition of claim 1, wherein the cationic polymeric fabric-softening boosting component has a charge density of from about 0.2 meq/g to about 1.5 meq/g.

7. An auxiliary composition of claim 1, wherein the cationic polymeric fabric-softening boosting component has a weight average molecular weight of from about 1,000,000 Da to about 2,000,000 Da.

8. An auxiliary composition according to claim 1, wherein the cationic polymeric fabric-softening boosting component has a degree of cationic substitution of from about 10% to about 60%.

9. An auxiliary composition according to claim 1, wherein the cationic polymeric fabric-softening boosting component is cationic guar gum.

10. An auxiliary composition according to claim 1, wherein the flocculating aid is a polyethylene oxide having a weight average molecular weight of from about 200,000 Da to about 700,000 Da.

11. An auxiliary composition according to claim 1, wherein the flocculating aid is present in the auxiliary composition as a separate particulate component to the co-particulate admix.

12. An auxiliary composition according to claim 1, wherein the weight ratio of clay to flocculating aid is in the range of from about 14:1 to about 160:1.

13. A laundry detergent composition comprising:
   (i) an auxiliary composition according to claim 1;
   (ii) a detersive surfactant;
   (iii) optionally a builder; and
   (iv) optionally a bleach.

14. A composition according to claim 13, wherein the composition is in free-flowing particulate form.

15. A composition according to claim 13, wherein the composition comprises at least about 10% by weight of the composition of alkyl benzene sulphonate detersive surfactant.

16. A composition according to claim 13, wherein the composition comprises at least about 2% by weight of the composition of cationic quaternary ammonium detersive surfactant.

17. A composition according to claim 13, wherein the composition comprises at least about 1% by weight of the composition of alkoxylated alkyl sulphate detersive surfactant.

18. A composition according to claim 13, wherein the composition comprises less than about 12% by weight of the composition of zeolite builder.

19. A composition according to claim 13, wherein the composition comprises at least about 8% by weight of the composition of the auxiliary composition.

20. A composition according to claim 13, wherein the composition comprises at least about 0.3% by weight of the composition of a flocculating aid.

* * * * *